United States Patent
Chang et al.

(10) Patent No.: US 11,775,978 B1
(45) Date of Patent: *Oct. 3, 2023

(54) EVENT-BASED AUTHENTICATION

(71) Applicant: Wells Fargo Bank, N.A., San Francisco, CA (US)

(72) Inventors: Michael Chang, Millbrae, CA (US); John Chuprevich, Davidson, NC (US); Kevin R. Cieslak, Novato, CA (US); Christopher P. Clausen, Novato, CA (US); Jeffrey A. Cornman, San Francisco, CA (US); Samuel Downing, Oakland, CA (US); Bryan Hall, Charlotte, NC (US); Julio Jiron, San Bruno, CA (US); Bryan Kroll, San Mateo, CA (US); Samuel Martin, San Francisco, CA (US); Traci Nguyen, San Francisco, CA (US); Virginia Randle, Tega Cay, SC (US); Priyamvada Singh, San Francisco, CA (US); Darrell L. Suen, San Ramon, CA (US); Kenneth L. Wright, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,753

(22) Filed: May 19, 2021

Related U.S. Application Data

(63) Continuation of application No. 15/352,303, filed on Nov. 15, 2016, now Pat. No. 11,017,404.

(51) Int. Cl.
| | |
|---|---|
| *G06Q 20/40* | (2012.01) |
| *G06F 21/31* | (2013.01) |
| *G06F 21/55* | (2013.01) |

(52) U.S. Cl.
CPC .......... *G06Q 20/405* (2013.01); *G06F 21/31* (2013.01); *G06F 21/554* (2013.01); *G06Q 20/4014* (2013.01)

(58) Field of Classification Search
CPC .. G06Q 20/405; G06Q 20/4014; G06F 21/31; G06F 21/554
See application file for complete search history.

(56) References Cited

U.S. PATENT DOCUMENTS

| | | | |
|---|---|---|---|
| 7,986,816 B1 | 7/2011 | Hoanca et al. | |
| 8,032,438 B1 | 10/2011 | Barton et al. | |

(Continued)

FOREIGN PATENT DOCUMENTS

| | | |
|---|---|---|
| WO | WO-03/062968 A1 | 7/2003 |
| WO | WO-2007/002752 A2 | 1/2007 |

(Continued)

OTHER PUBLICATIONS

Barett, Brian: Your Phone Will Replace Your Wallet At The ATM, Too, Jan. 28, 2016, pp. 1-16 (Year: 2016).*

(Continued)

*Primary Examiner* — Bijendra K Shrestha
(74) *Attorney, Agent, or Firm* — Foley & Lardner LLP

(57) ABSTRACT

Systems, methods, and computer-readable storage media utilized for event-based authentication. One method includes recognizing an event and receiving, from a device, a withdrawal request of a user, wherein the withdrawal request includes a captured feature by the device. The method further includes determining that the user is associated with the recognized event using at least a geographic proximity between the event and the withdrawal request, wherein the geographic proximity is a given radius around a location of the event, and wherein the device is within the given radius and adjusting authentication rules based on the (Continued)

determination that the user is associated with the recognized event, wherein the adjustment of the authentication rules includes adjusting a matching threshold between the captured feature and a reference feature. The method further includes processing the withdrawal request for the user based on the adjusted authentication rules.

20 Claims, 2 Drawing Sheets

(56) References Cited

U.S. PATENT DOCUMENTS

| | | | | |
|---|---|---|---|---|
| 8,082,213 | B2 * | 12/2011 | Lyons | H04L 63/205 |
| | | | | 713/168 |
| 8,285,639 | B2 | 10/2012 | Eden et al. | |
| 8,856,923 | B1 | 10/2014 | Kolman et al. | |
| 8,892,461 | B2 | 11/2014 | Lau et al. | |
| 8,971,930 | B2 | 3/2015 | Li et al. | |
| 9,094,388 | B2 | 7/2015 | Tkachev | |
| 9,171,306 | B1 * | 10/2015 | He | G06Q 20/405 |
| 9,654,477 | B1 * | 5/2017 | Kotamraju | G06F 21/316 |
| 10,303,869 | B1 * | 5/2019 | Duke | G06F 21/36 |
| 2008/0010674 | A1 * | 1/2008 | Lee | G06F 21/34 |
| | | | | 726/7 |
| 2010/0029219 | A1 * | 2/2010 | Pacull | H04B 1/036 |
| | | | | 455/90.1 |
| 2011/0185401 | A1 | 7/2011 | Bak et al. | |
| 2011/0212700 | A1 | 9/2011 | Petite | |
| 2011/0302011 | A1 | 12/2011 | Yoder et al. | |
| 2012/0265681 | A1 | 10/2012 | Ross | |
| 2013/0030934 | A1 * | 1/2013 | Bakshi | G06Q 20/3224 |
| | | | | 705/18 |
| 2013/0054433 | A1 | 2/2013 | Giard et al. | |
| 2014/0122209 | A1 | 5/2014 | Argue et al. | |
| 2014/0155094 | A1 | 6/2014 | Zises | |
| 2014/0289827 | A1 * | 9/2014 | Tang | H04L 63/107 |
| | | | | 726/6 |
| 2014/0289833 | A1 * | 9/2014 | Briceno | H04L 9/006 |
| | | | | 726/5 |
| 2014/0289867 | A1 | 9/2014 | Bukai | |
| 2015/0032628 | A1 * | 1/2015 | Randall | G06Q 20/40 |
| | | | | 705/44 |
| 2015/0081349 | A1 * | 3/2015 | Johndrow | G06Q 20/405 |
| | | | | 705/5 |
| 2015/0088633 | A1 | 3/2015 | Salmon et al. | |
| 2015/0142651 | A1 | 5/2015 | Howe | |
| 2015/0147995 | A1 | 5/2015 | Bontu et al. | |
| 2015/0324559 | A1 * | 11/2015 | Boss | G06Q 50/01 |
| | | | | 726/1 |
| 2016/0048842 | A1 | 2/2016 | Trivedi et al. | |
| 2016/0087957 | A1 | 3/2016 | Shah et al. | |
| 2016/0150367 | A1 | 5/2016 | Anand et al. | |
| 2016/0321663 | A1 | 11/2016 | Batlle | |
| 2018/0130062 | A1 * | 5/2018 | O'Donnell | G06Q 20/20 |

FOREIGN PATENT DOCUMENTS

| | | | | |
|---|---|---|---|---|
| WO | WO-2009132338 A2 * | 10/2009 | | G06F 16/24578 |
| WO | WO-2013181151 A2 * | 12/2013 | | B66C 13/18 |

OTHER PUBLICATIONS

Hayashi et al.: CASA: Context-Aware Scalable Authentication, Jul. 2013, Symposium On Usable Privacy and Security (SOUPS), New Castle, UK, pp. 1-10. (Year: 2013).*

Freeman et al.: Who are You? A Statistical Approach to Measuring User Authenticity, Feb. 21-24, 2016, NDSS '16, pp. 1-15. (Year: 2016).*

Otis, John: An ATM for when disaster strikes? Apr. 29, 2011, The World, Economics/Global Post, pp. 1-2 (Year: 2011).*

Libicki et al.: Influences on ythe Adptation of Multifactor Authentication, 2011, RAND Homeland Security and Defense Center, pp. 1-63. (Year: 2011).*

Martella et al.: On Current Crowd Management Practices and the Need for Increased situation Awareness, Prediction and Intervention, Sep. 7, 2016, pp. 1-24 (Year: 2016).

Wainwright, Corey: 12 Ways to create a User-Friendly Website Registration Process, HubSpot, Feb. 13, 2012, pp. 1-11.

Zhang et al., Location-based Authentication Authorization Using Smart Device, 2012, pp. 1-10, (Year: 2012).

* cited by examiner

US 11,775,978 B1

EVENT-BASED AUTHENTICATION

CROSS-REFERENCE TO RELATED APPLICATIONS AND CLAIM OF PRIORITY

This application is a continuation of and claims priority to U.S. patent application Ser. No. 15/352,303, entitled "Event Based Authentication," filed Nov. 15, 2016, of which is incorporated herein by reference in its entirety and for all purposes.

TECHNICAL FIELD

Embodiments of the present disclosure relate generally to systems and methods for authenticating a customer of a financial institution based on a recognized event.

BACKGROUND

Financial institutions such as banks offer customers access to various types of transactions in various ways, such as withdrawing cash at an ATM machine, purchasing goods/services at a store or online, transferring funds, and so on. When facilitating the transaction, the financial institution may need to authenticate the customer to confirm that the person requesting the transaction is authorized to perform the transaction. The customer may be asked to perform a task that a fraudulent individual (i.e., a "fraudster") would unlikely be able to perform. For example, the customer may be asked to provide a physical object (e.g., credit card, ATM card, etc.), a password (e.g., PIN), a biometric feature (e.g., fingerprint), and so on, that can be used to authenticate the customer. During emergency events such as earthquakes and floods, it might be difficult for customers to provide authentication in order to conduct financial transactions. In addition, at large gatherings such as festivals and sporting events, the authentication process in place may become inefficient because a customer may have to spend a long time waiting in line when there are hundreds of preceding customers. Authentication methods that balance efficiency and convenience with low fraudulent risk are generally desired.

SUMMARY

One embodiment of the present disclosure relates to a computer-implemented method performed by a financial institution computing system. The method includes recognizing, by the financial institution computing system, an event; receiving, by the financial institution computing system, a transaction request of a user; determining, by the financial institution computing system, that the user is associated with the recognized event; adjusting, by the financial institution computing system, authentication rules for the user; and processing, by the financial institution computing system, the transaction request for the user based on the adjusted authentication rules.

Another embodiment of the present disclosure relates to a financial institution computing system. The system includes a network interface circuit structured to receive a transaction request of a user, and a processor communicably coupled to the network interface circuit. The processor is structured to recognize an event, determine that the user is associated with the recognized event, adjust authentication rules for the user, and process the transaction request for the user based on the adjusted authentication rules.

A further exemplary embodiment relates to a non-transitory computer-readable media having computer-executable instructions embodied therein, when executed by a processor of a financial institution computing system, cause the financial institution computing system to perform a process. The process includes recognizing an event, receiving a transaction request of a user, determining that the user is associated with the recognized event, adjusting authentication rules for the user, and processing the transaction request for the user based on the adjusted authentication rules.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Referring generally to the figures, systems and methods for authenticating a user based on an event are described. The event may include large-scale events such as natural disasters (e.g., earthquakes, floods, etc.), large gatherings (e.g., festivals, sporting events, etc.), and mass activities at a location. A computing system operated by a financial institution can recognize the event based on information collected from a data network and/or unusual transaction patterns that are going on. The computing system can also determine that a user requesting a transaction is associated with the recognized event based, for example, on geographic proximity between the user and the event, temporal proximity between the user and the event, type of the transaction request, and/or relation of the transaction request and transaction requests of other associated users. The computing system can then adjust the authentication rules for the user to make the authentication process more convenient and efficient without risking fraudulence.

Figure 1:
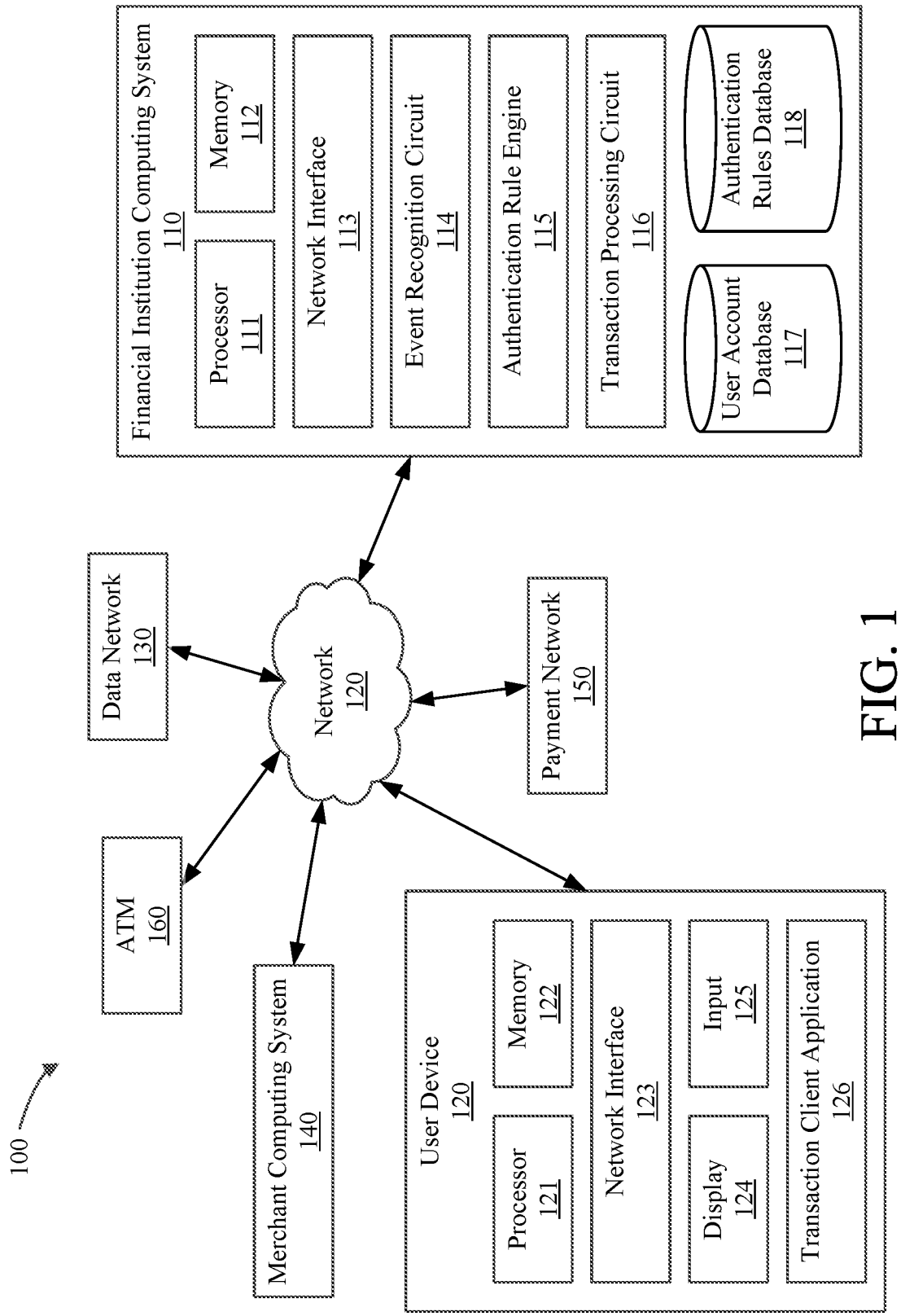
FIG. 1 is a schematic diagram of a computing environment for authenticating a user based on an event according to an example embodiment.

Referring now to FIG. 1, a schematic diagram of a computing environment 100 for authenticating a user based on an event is shown according to an example embodiment. A financial institution computing system 110 recognizes an event based on information collected from a data network 130, unusual transaction pattern happening with a merchant computing system 140 and/or at an ATM 160. A user, being associated with the event, requests to conduct a transaction, such as withdrawing cash from the ATM 160, or purchasing services/goods with the merchant computing system 140, or making payments via a user device 120. The request may go directly to the financial institution computing system 110 or reach the financial institution computing system 110 through a payment network 150 for authenticating the user and authorizing the transaction. The financial institution computing system 110 determines that the user is associated with the event based on geographic proximity between the user and the event, temporal proximity between the user and the event, type of the transaction request, and/or relation of the transaction request and transaction requests of other associated users. Then the financial institution computing system 110 adjusts the authentication rules for the user and processes the user's transaction request accordingly. The financial institution computing system 110, the user device 120, the data network 130, the merchant computing system 140, the payment network 150, and the ATM 160 can communicate over the network 102.

The financial institution computing system 110 is a computing system operated by a financial institution, which can include any commercial or private (e.g., investment) banks, credit unions, brokerages, insurance companies, investment companies, or any other entity or establishment that conducts financial transactions such as investments, loans, and deposits. The financial institution may provide (e.g., issue, manage, etc.) one or more financial accounts (e.g., savings account, credit card account, checking account, investment account, etc.) to a plurality of customers, including the user of the user device 120. The financial institution may also maintain financial information relating to the user, including financial information relating to the one or more financial accounts held by the user. The financial information may also various types of authentication rules that can be used to authenticate the user. In some embodiments, the financial institution computing system 110 may be representative of a plurality of financial institutions that are associated with the user, each maintaining financial information of the user.

The financial institution computing system 110 includes a processor 111, memory 112, and a network interface 113. The processor 111 may be an application specific integrated circuit (ASIC), one or more field programmable gate arrays (FPGAs), a digital signal processor (DSP), a group of processing components, or other suitable electronic processing components. The one or more memory devices 112 (e.g., RAM, ROM, NVRAM, Flash Memory, hard disk storage, etc.) store data and/or computer code for facilitating at least some of the various processes described herein. The network interface 113 allows the financial institution computing system 110 to send and receive data to and from external devices and entities via the network 102, including the user device 120, the data network 130, the merchant computing system 140, the payment network 150, and the ATM 160. The financial institution computing system 110 further includes an event recognition circuit 114, an authentication rules engine 115, and a transaction processing circuit 116. The event recognition circuit 114 is structured to recognize an event based on information collected from a data network 130, unusual transaction pattern happening with a merchant computing system 140 and/or at an ATM 160. The authentication rules engine 115 is structured to determine authentication rules for customers, including the user associated with the event. The transaction processing circuit 116 is structured to process the transaction request for the user based on the determined rules. The operations of the event recognition circuit 114, the authentication rules engine 115, and the transaction processing circuit 116 will be discussed in detail below with reference to FIG. 2.

In some examples, each of the event recognition circuit 114, the authentication rules engine 115, and the transaction processing circuit 116 is implemented within the processor 111. For example, each circuit is implemented as a software application stored within the memory 112 and executed by the processor 111. Accordingly, such examples can be implemented with minimal additional hardware costs. However, other examples relate to apparatuses and methods implemented with dedicated hardware specifically configured for performing operations described herein with respect to at least one of the event recognition circuit 114, the authentication rules engine 115, and the transaction processing circuit 116. For example, at least one circuit is implemented with a processing component separate from the processor 111.

Still referring to FIG. 1, the financial institution computing system 110 includes various databases, for example, a user account database 117 and an authentication rules database 118. The user account database 117 may hold, store, categorize, and otherwise serve as a repository of account information for customers of the financial institution. The user may have one or more financial accounts (e.g., savings account, credit card account, checking account, investment account, etc.) with the financial institution that operates the financial institution computing system 110. The account information includes user authentication information (e.g., account numbers, username/password combinations, device authentication tokens, security question answers, etc.), various activity details and/or statements relating to the account(s) (e.g., credit/debit statements), etc.

The authentication rules database 118 may hold, store, categorize, and otherwise serve as a repository of authentication rules that can be applied. The authentication rules may include text-based authentication, voice-based authentication, pattern-based authentication, graph-based authentication, biometric-based authentication, and so on. In particular, the text-based authentication may include a password validation in which the user is asked to enter a username, a password, or a combination, such as a string of numbers, symbols, characters or any combination thereof. In the graph-based authentication, the user is asked to connect all points in a correct way for validity verification. Similarly, a user is required to speak a sound password in the voice-based authentication, draw a pattern in the pattern-based authentication, or provide biometric features (e.g., face, fingerprint, iris, etc.) in the biometric-based authentication. In some embodiments, the authentication rules include device-based authentication, i.e., authenticating the device associated with the user based on a unique device identifier. Different types of authentications may employ corresponding authentication processes. In some examples, the user accounts database 117 and the authentication rules database may be stored using the memory 112. In other at least one database is stored in a storage device separate from the memory 112, such as a cloud storage.

The financial institution computing system 110 can recognize an event based on information collected from the data network 130. The event may include large-scale events such as natural disasters (e.g., earthquakes, floods, etc.) or large gatherings (e.g., festivals, sporting events, etc.). The data network 130 includes any system that provides data, such as online publication and news providers (e.g., online newspapers, online magazines, television websites, etc.). The data network 130 also includes social networking service providers such as Facebook, Twitter, LinkedIn, Pinterest, Tumblr, Instagram, etc. A social network refers to a computer network connecting entities by a set of social associations, professional associations, and/or other relationships that link members of the social network. The social networking service provider provides one or more social networking accounts to the members. The members can post entries using the accounts. The financial institution computing system 110 can receive data (e.g., news, posts) from the data network 130 via the network interface 113 over the network 102. The event recognition circuit 140 decides whether the event should impact the authentication process and extracts time, location, event, etc. from the data if should. The event recognition circuit 140 can make the decision based on the number of people that would be involved in the event, the extent of the impact the event has, and so on. For example, the event recognition circuit 140 receives data from the data network 130 indicating that a sporting event is taking place. Based on historical record, the event recognition circuit 140 decides that thousands of people will be attending the event and then determines that the authentication process should be adjusted. In another example, the event recognition circuit 140 receives data from the data network 130 indicating an earthquake is occurring in certain area. Based on the severity of the earthquake, the event recognition circuit 140 decides that the authentication process should be impacted.

The financial institution computing system 110 can also recognize an event based on unusual transaction pattern happening with a merchant computing system 140. The event includes mass activities at a physical or a virtual location, such as unusually high purchases of similar goods at a geographic location or a website operated by a merchant. The merchant computing system 140 may include a merchant point of sale ("POS") system located at a physical store or a system operating the merchant's website. Customers can purchase goods at the store and make payments using physical cards (e.g., credit cards and debit cards), use digital wallets, or provide information of an account (e.g., number of a credit card, expiration date, etc.) to purchase online. The transaction information may go directly to the financial institution computing system 110 or reach the financial institution computing system 110 through a payment network 150 for authentication. The event recognition circuit 114 analyzes the transaction pattern and determines that mass activities are going on when an unusual pattern comes up. For example, sales of water at a store near a stadium is usually about ten bottles in an hour. On a Saturday evening, the sales of water at the store increases to one hundred bottles in an hour. The event recognition circuit 114 can determine that mass activities of purchasing water are going on based on the unusual pattern. Another example, online sales of an electronic product is about twenty items online every day. When the merchant launches an online promotion, the sales go up to two hundred items a day. The event recognition circuit 114 can determine that mass activities of purchasing the electronic product are going on based on the unusually high traffic.

The payment network 150 facilitates transactions between financial institutions, for example, transactions between issuers of payment cards (e.g., credit or debit cards) for the customers and financial institutions for the merchants. As used herein, an issuer refers to a financial institution (e.g., a bank) that creates and maintains financial accounts associated with a payment card. The issuers for the customers and the merchants can be called "member banks" of the payment network 150. That is, the member banks associated with the payment network 150 are assumed to follow established protocols for transferring funds using the payment network 150. The payment network 150 may be operated or owned by a third party entity or a joint venture from the member banks in the pursuit of providing easy interbank fund transfers. In some embodiments, the payment network 150 is implemented as a computing system or server. The payment network 150 may confer with the financial institution computing system 110 prior to making the payment. In particular, the payment network 150 may request the financial institution computing system 110 to authenticate the user and authorize the transaction.

The financial institution computing system 110 can recognize an event based on unusual transaction patterns happening at the ATM 160. The event includes mass activities of drawing cash or conducting other transactions from ATMs within a geographical location. The ATM 160 may be affiliated with the financial institution operating the financial institution computing system 110. ATMs can perform transactions related to financial accounts, for example, withdrawal of money from a checking or savings account. The user enters the desired withdrawal amount and information for authentication/authorization. If the transaction is approved, the user receives the requested amount. ATMs may also be used for credit card transactions and credit card cash advances, money transfer, payments, etc. In some embodiments, a physical card (e.g., a prepaid debit card) associated with the user's financial account is used at the ATM 160. The card stores information associated with the financial account, e.g., account numbers, transaction histories, personal identification numbers (PINs) and/or card verification values (CVVs), the amount of funds held in the account, etc. Information relating to transactions at the ATM 160 can be captured by the financial institution computing system 110. The event recognition circuit 114 analyzes the transaction pattern and determines that mass activities are going on when an unusual pattern comes up. For example, usually about twenty people withdraw cash from an ATM within a geographical location every day. If two hundred people draw cash from each ATM within that location someday, the event recognition circuit 114 can determine that mass activities of drawing cash are going on based on the unusual pattern.

The user can perform the transaction and/or provide authentication information via the user device 120. The user device 120 may be a smartphone, a portable media device, a personal digital assistant (PDA), a laptop computer, or a personal computer. The user device 120 includes a processor 121, memory 122, and a network interface 123. Memory 122 stores various instructions that, when executed by the processor 121, control the operation of the user device 120. The network interface 123 allows the user device 120 to send and receive data to and from external devices and entities via the network 102. The network interface 123 may be a wireless network interface that communicates with a wireless communication protocol (e.g., 802.11a/b/g/n, Bluetooth, Zigbee, CDMA, GSM, LTE, WiMax, etc.) or a wired communication protocol (e.g., Ethernet, USB, Thunderbolt, etc.).

The user device 120 includes a display 124 and an input 125. In some embodiments, the display 124 and the input 125 are integrated in a touchscreen display. The display 124 can display prompt asking the user to input authentication information through the input 125. In some embodiments, the user device includes a biometric sensor (not shown in the present Figure) that reads biometric data from the user for authentication, such as capturing the user's fingerprint, recording the user's voice, snapping a photo of the user, etc. The user device 120 can send the data to the financial institution computing system 110 for authentication through the network interface 123 over the network 102.

The user device 120 includes a transaction client application 126 for conducting transactions. The transaction payment client 126 may be a web browser that is configured to receive and display web pages (e.g., online banking web pages, online shopping web pages, etc.) or an application executed by the user device 120, such as a digital wallet application. As used herein, a digital wallet refers to a software application that serves as an electronic version of a physical wallet. The financial institution can set up a digital wallet per the user's request. In particular, the financial institution computing system 110 generates a unique user account for the user and assigns (or allows the user to select) a wallet access code ("WAC"). The WAC includes a password, a sound, a biometric feature (e.g., fingerprint) of the user, etc. The WAC is entered by the user when logging into the digital wallet application through the user device 120. In further embodiments, the user may be prompted to enter the WAC prior to allowing the user to pay through the digital wallet application. Additionally, a unique device identifier may be generated for the user device 120. The device identifier is used to register the user device 120 and to link the user device 120 with the user. In some embodiments, the authentication process includes validating the WAC and authenticating the device identifier by the financial institution computing system 110.

The network 102 facilitates communication between the above-noted devices and entities. The network 102 may include private networks, public networks, or a combination thereof. In some embodiments, the network 102 includes the Internet.

Figure 2:
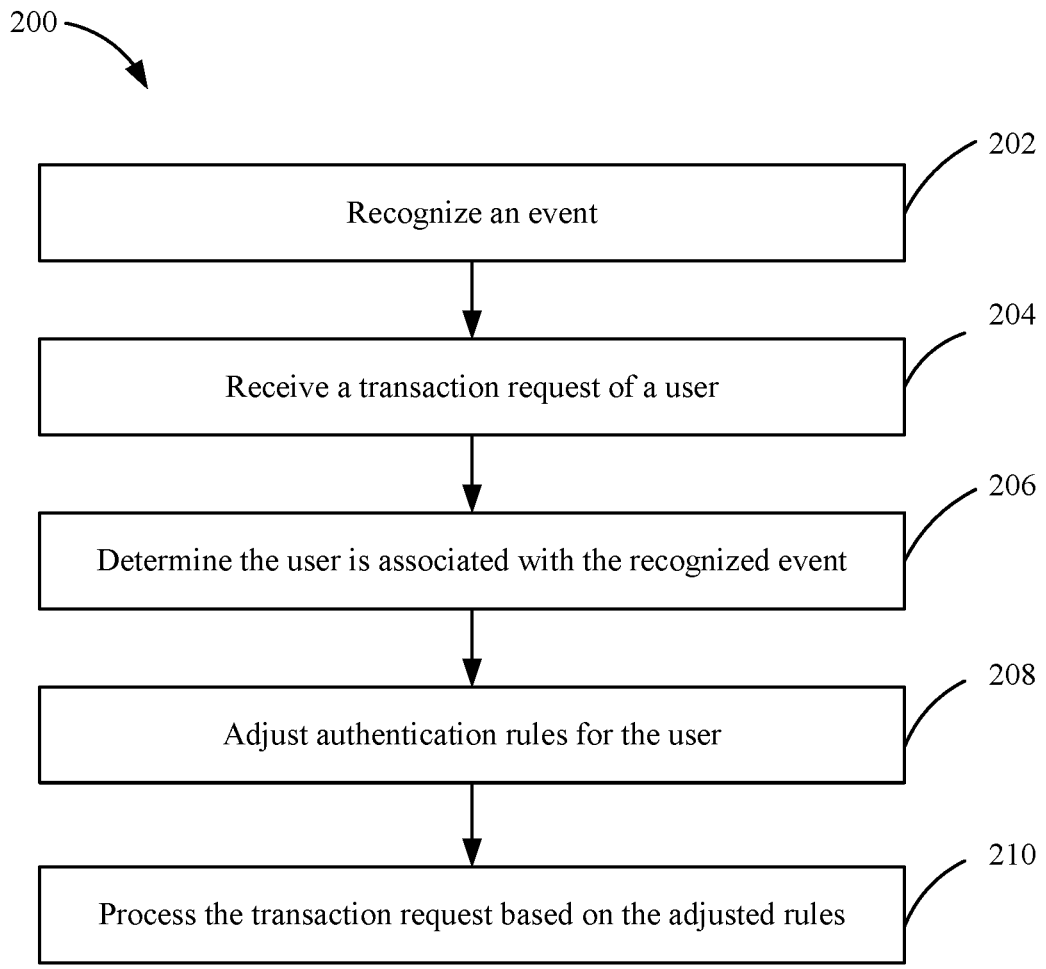
FIG. 2 is a schematic flow diagram of a process for authenticating a user based on an event, according to an example embodiment.

Referring to FIG. 2, a flow diagram of a method 200 of authenticating a user based at least in part on an event is shown according to an example embodiment. In the example embodiment, the process 200 is described herein as being performed by the financial institution computing system 110, which may include a processing circuit (e.g., processor 112 combined with memory 114), the network interface 113, the user accounts database 117, the authentication rules database 118, the event recognition circuit 114, the authentication rules engine 115, and the transaction processing circuit 116. In some embodiments, however, one or more steps of the process 200 may be performed by the data network 130, the merchant computing system 140, the payment network 150, the ATM 160, and/or the user device 120.

The process 200 begins when the financial institution computing system 110 recognizes an event at 202. The event may include large-scale events such as natural disasters (e.g., earthquakes, floods, etc.), large gatherings (e.g., festivals, sporting events, etc.), and mass activities by a large group of people (e.g., many people purchasing similar goods, drawing cash, etc.) at a physical location or online. As discussed above, the financial institution computing system 110 captures these types of events based on information collected form the data network 130, unusual transaction pattern happening with the merchant computing system 140, and/or unusual transaction pattern happening at the ATM 160. The data network 130 may include online news providers that publish newspapers or broadcast television news online. The financial institution computing system 110 can analyze the news data to decide whether the event should impact the authentication process. If the event would likely generate some type of transaction demands among a large group of people, it can be decided to warrant adjustment of the authentication process. For example, if an earthquake at a location is reported, the financial institution computing system 110 can decide to adjust authentication rules relating to food and water purchases at the location. The financial institution computing system 110 can further extract time, location, and type of the event for the use by other steps of the process 200. The data network 130 can also include social networking service providers such as Facebook, Twitter, LinkedIn, Pinterest, Tumblr, Instagram, etc. The financial institution computing system 110 can analyze entries posted by members of the social network to capture the event. For example, if multiple people posted entries on a carnival parade at a location, the financial institution computing system can decide to adjust authentication rules for the location.

The financial institution computing system 110 can also recognize an event based on unusual transaction pattern happening with the merchant computing system 140 and/or the ATM 160. Information of purchases at the merchant computing system 140 can reach the financial institution computing system 110 directly or through the payment network 150. The financial institution computing system 110 can analyze the transaction information to recognize mass activities that warrant an adjustment of authentication rules. For example, when much higher than usual (e.g., ten times higher than usual) purchases of similar goods are happening with a merchant computing system at a location or online, the financial institution computing system 110 can decide to relax the authentication rules. By the same token, information of transactions (e.g., withdrawing cash) at the ATM 160 can reach the financial institution computing system 110, which analyzes the transaction information to recognize mass activities. For example, when much higher than usual (e.g., ten times higher than usual) traffic happens at one hundred ATMs at a location, the financial institution computing system 110 can decide to relax the authentication rules because it is unlikely that a fraudster could be hitting the hundred ATMs at once.

After the event is recognized, the financial institution computing system 110 receives a transaction request of the user at 204. The transaction being requested may include drawing cash at the ATM 160, purchasing goods/services with the merchant computing system 140, making payments through the user device 120, and so on. The user may request at the ATM 160 to perform transactions related to financial accounts, for example, withdrawal of money from a check or savings account maintained with the financial institution computing system 110. The ATM 160 may be affiliated with the financial institution that operates the financial institution computing system 110. The ATM 160 may also be used for credit card transactions and credit card cash advances, money transfer, payments, etc. In some embodiments, the user utilizes a physical card (e.g., a prepaid card, a debit card) associated with the user's financial account at the ATM 160. The card stores information associated with the user's financial account, such as account numbers, the amount of funds held in the account, personal identification numbers (PINs) and/or card verification values (CVVs), etc. The ATM 160 can read the stored information to identify the financial institution associated with the card and connect with the financial institution computing system 110 operated by the financial institution for the process of authentication and transaction.

The user may request at the merchant computing system 140 to perform transactions relating to purchase of goods/services. The merchant computing system 140 may include a merchant point of sale ("POS") system at a store or a website. In some embodiments, the user purchases goods/services at the store and makes payments using a physical card (e.g., credit cards and debit cards) associated with an account maintained with the financial institution, or provides information of the account (e.g., number of a credit card, expiration date, etc.) associated with the financial institution to purchase online. The merchant computing system 140 then transmits an authentication request with the received account information to the payment network 150 for approval to proceed with the transaction which forwards the authorization request to the financial institution computing system 110. In some embodiments, the user makes the payment using the digital wallet application executed by the user device 120. The digital wallet can be associated with one or more forms of payments (e.g., credit card, debit card, gift card, etc.). The financial institution that provides the digital wallet services can be the same as or different from the financial institution that maintains accounts associated with the payment forms. The user needs to be first authenticated by the financial institution providing the digital wallet services in order to use the digital wallet. The user can enter the wallet access code (WAC) to access (i.e., unlock) the digital wallet application. The WAC includes a password, a sound, or a biometric feature (e.g., fingerprint) of the user. The digital wallet application can be opened manually by the user at the time of purchasing goods/services offered by the merchant, or opened automatically when the user device 120 approaches the merchant POS terminal (e.g., based on detected NFC signals emitted by the merchant POS terminal). The user device 120 transmits the WAC to the financial institution computing system providing the digital wallet services for authentication. In further embodiments, a unique device identifier is associated with the user device 120. The authentication process includes validating the WAC and authenticating the device identifier by the financial institution computing system 110.

The user also needs to be authenticated by the financial institution that maintains accounts associated with the payment forms. In particular, the digital wallet application can make payments to the merchant POS terminal through host card emulation ("HCE"). The digital wallet application communicates with the financial institution computing system that provides the digital wallet services and downloads a payment token or a barcode that emulates a card. The user passes the payment token to the merchant POS terminal through wireless communication with the POS terminal, such as NFC transmission. Or, the digital wallet application presents barcodes (e.g., two-dimensional barcodes or there-dimensional barcodes) on the display 124 that are scanned by a scanner of the merchant POS terminal. The merchant POS terminal then transmits the received token/barcode to the payment network 150 for approval to proceed with the transaction which forwards the authorization request to the financial institution computing system that maintains the account associated with the payment form, as discussed above relating to purchasing through the merchant computing system 140.

The financial institution computing system 100 determines that the user is associated with the recognized event at 206. The determination may be made based on whether the transactions were through the same merchant system or merchant type, whether the transactions were for similar goods or services, geographic proximity between the users at the time of the transactions, as determined by the physical geolocation data, and/or temporal proximity between the times of the transaction requests by the consumers. For example, the user is attempting to conduct a transaction at the ATM 160. The ATM 160 sends the authentication request to the financial institution computing system 110, which can include an ATM identifier and a timestamp. The financial institution computing system 100 locates the ATM based on the ATM identifier and compares its location with the location of the event extracted at process 202. If the ATM location is within a given radius of the event location, or within a specified boundary region, the financial institution computing system 110 determines that the user is proximate to the event geographically. It should be understood that various standards can be used to determine the geographic proximity. To determine the temporal proximity, the financial institution computing system 110 compares the timestamp with the time of the event extracted at process 202. If the timestamp is within a given time difference with the event time, or within a specified period of time, the financial institution computing system 110 determines that the user is proximate to the event temporally. It should be understood that various standards can be used to determine the temporal proximity. Similarly, the temporal and geographic proximity can be determined based on the transaction information sent from the merchant computing system 140 at a store. The authentication request from the merchant computing system 140 to the financial institution computing system 100 can include information of the location and time of the transaction. The financial institution computing system 100 can use the information to determine temporal and geographical proximity the same way as discussed above.

When the user makes payment via the user device 120, the GPS sensors embedded in the user device 120 can provide information of the location which can be passed on to the financial institution computing system 110. In other embodiments, the financial institution computing system 110 can use geo-IP lookup table to determine the geographical location of the user device 120 based on its IP address. In some embodiments, the financial institution computing system 110 seeking to evaluate the riskiness of a transaction may require additional data from the user device 120 to provide additional assurance that the user is located in a specific geographic area to drive authentication decisions. It should be understood that these examples are for illustration, various techniques can be used to determine the current physical location of the user.

In some embodiments, the financial institution computing system 110 determines that the user is associated with the recognized event based at least in part on the type of transactions. For example, the user is attempting to purchase goods from the merchant computing system 140 online. The authentication request from the merchant computing system 140 to the financial institution computing system 110 can include information of the type of the goods and time of the transaction. The financial institution computing system 110 has recognized that the merchant just launched a promotion for that type of goods and can determine that the user is involved in the event.

In some embodiments, the financial institution computing system 110 determines that the user is involved in the recognized event based at least in part on a relation of the transaction request and transaction requests of other users. Such correlated purchases are inherently more expected and therefore less suspect than individual, uncorrelated purchases. For example, the financial institution computing system 110 knows that the user is related to a church based on the registration information of the user and/or entries by the user at the social network. The user is attempting to buy an air ticket to a destination in Europe. Data shows that thirty purchases of air tickets have been made for a group of thirty people related to the same church with similar destinations and arrival dates. The financial institution computing system 110 can determine that the user together with the other thirty users are involved in the mass activities of making a trip to Europe as a group and adjust authentication process based on the determination. It should be understood that these examples are for illustration, various methods can be used to determine the user is involved in a recognized event.

Once the user is determined to be associated with the recognized event, the financial institution computing system 110 adjusts the authentication rules for the user accordingly at 208. The authentication rules engine 115 determines the set of credentials to request from the user for authentication based on the event. As discussed above, there are various types of authentication rules, such as text-based authentication, voice-based authentication, pattern-based authentication, graph-based authentication, biometric-based authentication, and so on. Different types of authentications may employ corresponding authentication processes. In particular, for the text-based authentication, the user is asked to enter a username, a password, or a combination, such as a string of numbers, symbols, characters or any combination thereof, for validation. For the graph-based authentication, the use is asked to connect all points in a correct way for validity verification. Similarly, a user is required to speak a sound password in the voice-based authentication, draw a pattern in the pattern-based authentication, or provide biometric features (e.g., face, fingerprint, iris, etc.) in the biometric-based authentication. In some embodiments, the authentication rules include device-based authentication, i.e., authenticating the device associated with the user based on a unique device identifier. In addition, for a particular authentication rule, the strength required for approval can vary. For example, in a biometric-based authentication, the user's biometric features are captured and compared to reference biometric features associated with the user and stored in the user accounts database. A strong authentication rule requires an accurate match of the captured features and the reference features. A weak authentication rule requires a rough match of the two. Different combinations of types and levels of authentication rules achieve different securities. For example, in the POS/ATM environment, at a low security level, the user only needs to use the physical card without being required to enter the PIN, while at a high security level, not only a PIN but additional personal or biometric data may be required.

In some embodiments, to adjust the authentication rules, the financial institution computing system 110 removes one or more authentication restrictions for the user based on the event. For example, as discussed above, when the user makes payments from the digital wallet application on the user device 120, the financial institution computing system that provides the digital wallet services not only authenticates the user by the WAC, but also validates the user device. The device identifier associated with the user device 120 is compared to a reference device identifier stored earlier when the digital wallet application is registered. If the two identifiers do not match (e.g., the user logs in from a different device), the financial institution system usually challenges the user for additional authentication (e.g., asks the user to answer additional questions or sends a text message for confirmation). The additional authentication challenge can be dropped if the user is determined to be involved in a recognized event. In particular, the financial computing system 110 recognizes that Apple is launching a new product at a geographic location by capturing the news from the data network 130 and/or from significant purchases of the new products from Apple stores in the location. The financial computing system 110 also determines that the user is involved in the event because the user is at an Apple store within the location and just purchased the new product. Before long the financial computing system 110 receives a request of login the digital wallet from the new product. The request includes the correct WAC but a different device identifier which has been used before. The financial computing system 110 can remove the restriction on the device identifier, and not challenge the user for additional authentication.

Another example is dropping additional authentication challenges in the context of out-of-state transactions. When the user uses a credit card out of the home state, typically, the financial institution computing system 110 may apply additional authentication restrictions, for example, sending a text message to the user for confirmation. If the user is determined to be involved in a recognized event, the additional authentication restrictions can be dropped. The financial institution computing system 110 recognizes that a Super Bowl game is going on at a stadium within a location by capturing the news from the data network 130. It also determines that the user is involved in the event because the user is at the stadium. When the user pays with the credit card, the financial computing system 110 can drop the additional authentication restrictions (e.g., sending a text message for confirmation) although that is an out-of-state transaction. One or more authentication rules can be removed in the ATM context as well. As discussed above, for a high security level, the ATM transaction requires not only a PIN but additional personal or biometric data from the user. If it is determined that the user is involved in an earthquake, the financial institution computing system 110 can remove the restriction on the biometric features. It should be understood that the examples are for illustration only; there are various ways of removing authentication restrictions for the user being involved in a recognized event.

In some embodiments, to adjust the authentication rules, the financial institution computing system 110 relaxes an authentication restriction for the user. For example, the financial institution computing system 110 can decreases matching accuracies during the authentication process to tolerate some unintentional input errors from the user or save some input time. In the text-based authentication, the financial institution computing system 110 compares the text password input by the user with a reference password related to the user and stored in the user account database 117. Typically, the input password needs to exactly match the reference password in order to pass the authentication. If the user is involved in a recognized event, the financial institution computing system 110 can relax the rule, only requiring inexact or partial match. For example, the financial institution computing system 110 validates the user in response to a match between the beginning part of the input password and a corresponding part of the reference password, or the input password matching 70% of the reference password. Another example is the biometric-based authentication in which face recognition, fingerprint recognition, or iris recognition is used. The financial institution computing system 110 compares the biometric features received from the user device (e.g., captured by the biometric sensors) with reference biometric features related to the user and stored in the use account 117. If the matching accuracy between the captured features and the reference features reaches a predetermined threshold, the user passes the authentication. If the user is involved in a recognized event, the matching accuracy requirement can be lowered. Thus, roughly recognized biometric features may be matched well with reference features. Further examples of relaxing authentication rules include increasing the ATM limits, increasing the credit line, and so on. It should be understood that the examples are for illustration only; there are various ways of relaxing authentication restrictions for the user being involved in a recognized event.

In some embodiments, to adjust the authentication rules, the financial institution computing system 110 applies a different type of authentication restriction based on availability in the event. Take transactions at the merchant computing system 140 at a store as an example. Typically, the user is required to provide a physical card or the account number on the card for authentication. In a natural disaster such as an earthquake, the user might not have the card with him/her and does not remember the card number. The user knows the name of the financial institution, registered name, date of birth, address, social security number, and other personal information. The user also has the biometric features available. The merchant computing system 140 can pass the available information to the financial computing system 110 (e.g., through the payment network 150). The financial institution computing system 110 has known that the earthquake happened and designed a new risk evaluation model for the situation. If the financial institution computing system 110 determines that the user is at the store within the earthquake region, it may authenticate the user based on a combination of the information available to the user, such as registered name, date of birth, address, social security number, etc., and/or based on biometric features captured on the user.

Another example is in the context of making payments via the user device 120. Typically the user's fingerprint is used to unlock the digital wallet application and to make payments therefrom. The user is at a big sporting event (e.g., Olympic Games), in which many people are using the wireless devices for various purposes (e.g., sharing pictures on the social network, sending emails, etc.). The available bandwidth might be unstable to transmit the biometric features for authentication. In some embodiments, the financial institution computing system 110, upon recognizing the event, replaces the biometrics-based authentication with another type of authentication, e.g., text-based authentication. When the financial institution computing system 110 determines that the user is involved in the event, it requests the user to provide, for example, a registered passcode, registered name, etc. for authentication. In other embodiments, the financial institution computing system 110 determines to replace the biometrics-based authentication with the text-based authentication after failure of transmission of biometric features. In particular, the financial institution computing system 110 knows that the user is involved in the event and gets the failure information when the user is attempting to transmit the biometric features for authentication. The financial institution computing system 110 then prompts the user to provide a pre-registered secret answer to a personal question, registered email address, postal address, registered mobile identification number, etc. It should be understood that the examples are for illustration only; there are various ways of relaxing authentication rules for the user being involved in a recognized event.

The financial institution computing system 110 processes the transaction request for the user based on the adjusted rules at 210. The processing of the transaction request includes authenticating the user based on the adjusted rules. For example, when the user purchases goods through the merchant computing system 140, the payment network 150, which facilitates transactions between issuers for the user and the financial institution for the merchant, may request the financial institution computing system 110 to authenticate the user and authorize the transaction. In another example, when the user utilizes a physical card at the ATM 160 to withdraw cash, the ATM 160 reads the stored information in the card to identify the financial institution associated with the card and connects with the financial institution computing system 110 for the process of authentication and transaction. If the user meets the adjusted authentication rules, the financial institution computing system 110 will approve the transaction requested. Otherwise, the requested transaction will be declined.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    recognizing, by a computing system, an event;
    receiving, by the computing system from an automated teller machine (ATM), a withdrawal request of a user, wherein the withdrawal request comprises a captured feature by the ATM;
    determining, by the computing system, that the user is associated with the recognized event using at least a geographic proximity between the event and the withdrawal request, wherein the geographic proximity is a given radius around a location of the event, and wherein the ATM is within the given radius;
    adjusting, by the computing system, authentication rules based on the determination that the user is associated with the recognized event, wherein the adjustment of the authentication rules comprises lowering a matching percentage of a matching threshold between the captured feature and a reference feature; and
    processing, by the computing system, the withdrawal request for the user based on the adjusted authentication rules, wherein processing the withdrawal request includes dispensing fiat currency at the ATM.

2. The method of claim 1, wherein recognizing the event is based on a transaction pattern at a merchant or an automated teller machine (ATM), and wherein the event comprises at least one of a natural disaster, a gathering of people, and mass activities of people.

3. The method of claim 1, wherein determining the user is associated with the recognized event further comprises determining at least one of a second geographic proximity between the user and the event, a temporal proximity between the user and the event, a type of the withdrawal request, or a relation of the withdrawal request and transactions of other users.

4. The method of claim 3, wherein the temporal proximity is further determined by calculating a time difference between a timestamp of the user and a second timestamp of another associated user or by calculating a second time difference between the timestamp of the user and a third timestamp of the event.

5. The method of claim 1, wherein the authentication rules comprise at least one of text-based authentication, voice-based authentication, pattern-based authentication, graph-based authentication, and biometric-based authentication.

6. The method of claim 1, wherein the location of the event is a virtual location associated with a website operated by a merchant, and wherein the location of the event is determined based on at least one of an Internet Protocol (IP) address, a Global Positioning System (GPS) sensor, or one or more news sources.

7. The method of claim 1, wherein the captured feature is at least one of a biometric, a password, or a wallet access code (WAC).

8. The method of claim 1, wherein the device ATM of the withdrawal request is an automated telling machine (ATM) and the withdrawal request is a money request from a checking or savings account of the user.

9. The method of claim 1, further comprising:
adjusting, by the computing system, a type of authentication rule from a first type of authentication to a second type of authentication based on the recognized event.

10. The method of claim 1, wherein processing comprises authenticating the user and a user device associated with the user, wherein the user device stores a wallet access code (WAC) utilized by the computing system to authenticate the user.

11. A system comprising:
at least one processing circuit configured to:
recognize an event;
receive, from an automated teller machine (ATM), a withdrawal request of a user, wherein the withdrawal request comprises a captured feature by the ATM;
determine that the user is associated with the recognized event using at least a geographic proximity between the event and the withdrawal request, wherein the geographic proximity is a given radius around a location of the event, and wherein the ATM is within the given radius;
adjust authentication rules based on the determination that the user is associated with the recognized event, wherein the adjustment of the authentication rules comprises lowering a matching percentage of a matching threshold between the captured feature and a reference feature; and
process the withdrawal request for the user based on the adjusted authentication rules, wherein processing the withdrawal request includes dispensing fiat currency at the ATM.

12. The system of claim 11, wherein recognizing the event is based on a transaction pattern at a merchant or an automated teller machine (ATM), and wherein the event comprises at least one of a natural disaster, a gathering of people, and mass activities of people.

13. The system of claim 11, wherein determining the user is associated with the recognized event further comprises determining at least one of a second geographic proximity between the user and the event, a temporal proximity between the user and the event, a type of the withdrawal request, or a relation of the withdrawal request and transactions of other users, and wherein the temporal proximity is further determined by calculating a time difference between a timestamp of the user and a second timestamp of another associated user or by calculating a second time difference between the timestamp of the user and a third timestamp of the event.

14. The system of claim 11, wherein the location of the event is a virtual location associated with a website operated by a merchant, and wherein the location of the event is determined based on at least one of an Internet Protocol (IP) address, a Global Positioning System (GPS) sensor, or one or more news sources.

15. The system of claim 11, wherein the captured feature is at least one of a biometric, a password, or a wallet access code (WAC).

16. The system of claim 11, wherein the ATM of the withdrawal request is an automated telling machine (ATM) and the withdrawal request is a money request from a checking or savings account of the user.

17. The system of claim 11, wherein the at least one processing circuit further configured to:
adjust a type of authentication rule from a first type of authentication to a second type of authentication based on the recognized event.

18. The system of claim 11, wherein processing comprises authenticating the user and a user device associated with the user, wherein the user device stores a wallet access code (WAC) utilized by the at least one processing circuit to authenticate the user.

19. One or more non-transitory computer-readable storage media having instructions stored thereon that, when executed by at least one processing circuit, cause the at least one processing circuit to:
recognize an event;
receive, from an automated teller machine, a withdrawal request of a user, wherein the withdrawal request comprises a captured feature by the ATM;
determine that the user is associated with the recognized event using at least a geographic proximity between the event and the withdrawal request, wherein the geographic proximity is a given radius around a location of the event, and wherein the ATM is within the given radius;
adjust authentication rules based on the determination that the user is associated with the recognized event, wherein the adjustment of the authentication rules comprises lowering a matching percentage of a matching threshold between the captured feature and a reference feature; and
process the withdrawal request for the user based on the adjusted authentication rules, wherein processing the withdrawal request includes dispensing fiat currency at the ATM.

20. The one or more non-transitory computer-readable storage media of claim 19, having instructions stored thereon that, when executed by the at least one processing circuit, cause the at least one processing circuit to:
adjust a type of authentication rule from a first type of authentication to a second type of authentication based on the recognized event, wherein the captured feature is at least one of a biometric, a password, or a wallet access code (WAC).

* * * * *